July 5, 1949.
H. J. FINDLEY
2,475,229
DRIVE FOR AUXILIARY DEVICES
Filed July 10, 1944
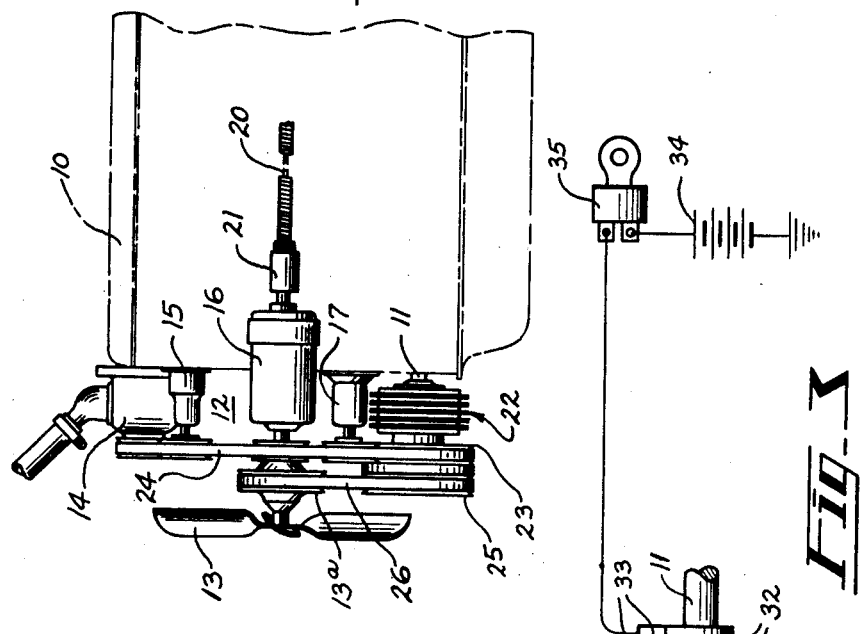
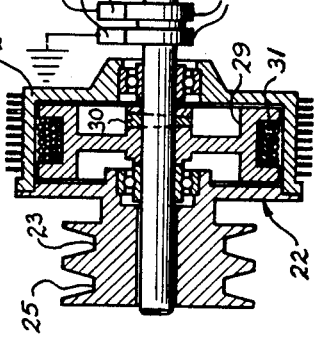
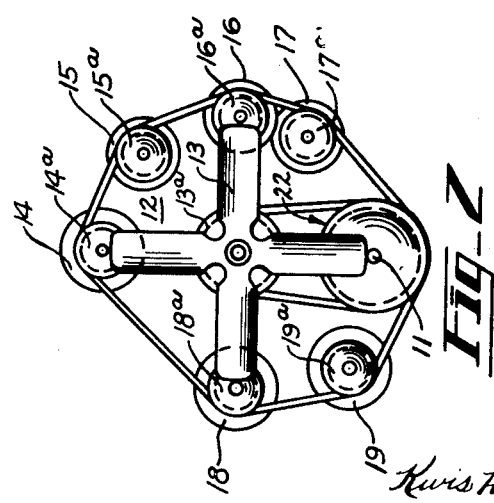
INVENTOR.
HOWARD J. FINDLEY
BY
Kwis Hudson, Boughton & Williams
ATTORNEYS Patented July 5, 1949

2,475,229

UNITED STATES PATENT OFFICE 2,475,229

DRIVE FOR AUXILIARY DEVICES

Howard J. Findley, Shaker Heights, Ohio, assignor to Eaton Manufacturing Company, Cleveland, Ohio, a corporation of Ohio Application July 10, 1944, Serial No. 544,297

2 Claims. (Cl. 172—284)

This invention relates to driving means for the auxiliary devices of an automobile or other motor vehicle and aims to provide novel driving means for this purpose through which important advantages of construction and operation are obtainable.

Heretofore the various auxiliary devices of motor vehicles have been connected with the vehicle engine in a manner such that the speed at which the auxiliary devices are driven varies with the operating speed of the engine. Since the vehicle engine is frequently operated at relatively high speeds for certain periods these auxiliary devices are likewise driven at high speeds for corresponding periods and, to enable them to withstand such usage, they have heretofore been made of a relatively heavy and costly construction. When these auxiliary devices are driven at such relatively high speeds they are subjected to increased wear and their operating efficiency and functional characteristics are usually not as satisfactory as when they are driven at a relatively slower and substantially constant speed. Moreover, the driving of such auxiliary devices at high speeds is wasteful of power because they absorb a considerable percentage of the horse-power developed by the vehicle engine.

The present invention seeks to overcome these difficulties and provides novel driving means for the auxiliary devices of a motor vehicle which enables these devices to be driven at a speed such that they can be of a lighter and more economical construction, will have a better operating life, and such that their functional characteristics are considerably improved.

Another object of this invention is to provide a novel driving means for the auxiliary devices of a motor vehicle in which a coupling is employed which operates with slippage for increased engine speeds so that the auxiliary devices will be driven at a substantially constant speed for all engine speeds coming within the usual driving range.

A further object of the invention is to provide novel driving means of the character mentioned, in which a substantially constant speed magnetic coupling is employed and establishes a common driving connection between the auxiliary devices and a power shaft of the vehicle engine.

Still another object of this invention is to provide novel driving means of the character mentioned, in which the auxiliary devices are disposed in a grouped arrangement and are connected with the magnetic coupling by an endless belt.

Other objects and advantages of the invention will be apparent from the following description when taken in conjunction with the accompanying sheet of drawings in which Fig. 1 is a side elevation showing a group of auxiliary devices associated with a vehicle engine and to which the novel driving means of the present invention has been applied;

Fig. 2 is an end view thereof; and

Fig. 3 is a longitudinal sectional view taken through the constant speed coupling and also showing an energizing circuit for the coupling.

The present invention can be advantageously applied to any motor vehicle having a driving engine which operates at variable speeds and one or more auxiliary devices driven from such engine. In Fig. 1 of the drawing I have shown such a variable speed vehicle engine 10, having a crankshaft or other driven shaft 11 which is available as a power take-off, and a group of auxiliary devices 12 which are driven from the engine by the novel driving means which will be presently described in detail. The engine 10 can be an internal combustion motor of either the reciprocating or rotary type, or can be an internal combustion turbine or a combination of any of these power devices.

The auxiliary devices constituting the group 12 may be any auxiliary devices desired to be used in connection with a motor vehicle and may comprise some or all of the devices of this kind which are conventionally used in the operation of motor vehicles or in connection with the internal combustion engines employed for driving such vehicles. As an example of the auxiliary devices to which the novel driving means of the present invention is applicable I have shown the group 12 as comprising a cooling fan 13, a water pump 14, a fuel pump 15, an electric generator 16, an oil pump 17, a blower 18 and a compressor 19.

The fan 13 may be the conventional fan used in connection with the radiator of an engine cooling system. The water pump 14 may be the conventional water pump used for circulating water through the engine cooling system. The fuel pump 15 may be a conventional fuel pump for supplying gasoline or other fuel to the charge forming apparatus of the engine 10. The generator 16 can be a conventional electric generator for supplying current to the storage battery and various electric devices of the vehicle. The oil pump 17 can be a pump for circulating lubricating oil to various parts of the engine and can also be used for supplying oil under pressure for actuating remotely located auxiliary devices such as window raising motors. The device 18 can be a fan or blower for the delivery of air for vehicle heating and ventilating purposes. The compressor 19 may constitute a part of a refrigerating or air-conditioning apparatus embodied in the vehicle. In addition to the various auxiliaries briefly referred to above, a drive may also be provided in the form of a flexible shaft 20 for driving one or more remotely located auxiliaries such as a windshield wiper. The flexible shaft 20 is connected with the shaft of the generator 16 through a suitable clutch or coupling 21.

The above-mentioned auxiliary devices 13 to 19 inclusive are all mounted on or adjacent the engine 10 and the auxiliaries 14 to 19 inclusive are disposed in a ring or annular series adjacent the power take-off provided by the driven shaft 11 of the vehicle engine. The cooling fan 13 occupies a more or less central position at the front of the engine 10 and the annular series defined by the auxiliaries 14 to 19 inclusive is disposed around the axis of rotation of the cooling fan and includes the driven shaft 11 as one unit of the series. In the arcuate arrangement shown in the drawing and just described above for the auxiliary devices, it will be observed that these devices are distributed so that some of them are located above and on both sides of the power shaft 11.

My novel driving means for the above-mentioned auxiliary devices involves the use of a substantially constant speed coupling 22 which is connected with the engine shaft 11 and provides a common driving connection between the auxiliary devices and such engine shaft. The coupling 22 is preferably mounted on the engine shaft 11 and the operating connection between such coupling and the auxiliary devices can be made by the use of any suitable torque-transmitting means. The auxiliary devices 14 to 19 inclusive are provided with individual drive members in the form of the pulleys 14a and 19a inclusive which are connected with a pulley 23 of the coupling by means of an endless belt 24 extending as a continuous driving loop around all of these pulleys. The fan 13 is also provided with a pulley 13a and the coupling 22 is provided with a second pulley 25 with which the fan is connected by means of the endless belt 26. These various pulleys are of appropriate diameters to give the desired transmission ratios for the respective devices. The auxiliary devices 14 to 20 inclusive with their drive members 14a to 20a inclusive are of the type which are continuously driven during rotation of the shaft 11 of the engine 10.

The coupling 22 is here shown as being a magnetic or eddy-current coupling comprising a housing 28 of magnetic material rotatably mounted on the shaft 11, or an extension thereof, and carrying pulleys 23 and 25, and a rotor 29 of magnetic material disposed in the housing 28 and connected with the shaft 11 as by means of the pin 30. The rotor 29 carries a magnetizing coil or winding 31 to which energizing current can be supplied by means of the slip rings 32 and the brushes 33 cooperating therewith. The energizing current for the winding 31 can be supplied to the brushes 33 by a suitable circuit connected with the storage battery 34 of the vehicle and extending through a key controlled switch 35 which can be the conventional ignition switch.

As mentioned above, the vehicle engine 10 runs at variable speeds during the operation of the vehicle and to prevent the auxiliary devices 13 to 19 inclusive from being driven at an excessive or undesirable rate of speed the coupling 22 is designed to operate with slippage such that the auxiliary devices will be driven at a substantially constant speed for all operating speeds of the engine 10 which come within the usual driving range, that is, for all engine speeds lying between idling speed and a speed corresponding with a vehicle speed of approximately sixty-five miles per hour. This constant speed for the auxiliary devices may be any selected constant speed which will be suitable for all of the auxiliary devices of the group 12 and the coupling 22 will be designed so that the slippage which occurs therein will result in the auxiliary devices being driven at such selected constant speed whenever the vehicle engine is operating at speeds coming within the usual driving range. It will accordingly be understood from the foregoing description that the eddy-current magnetic coupling 22 operates with continuous slippage while energized and which results in the auxiliary devices being driven at a speed which is substantially constant for all operating speeds of the engine above a predetermined value.

From the foregoing description and the accompanying drawing it will now be readily understood that I have provided novel driving means for the auxiliary devices of a motor vehicle by which these devices can be driven at a substantially constant speed which permits them to be of a lighter and more economical construction than heretofore and also results in a better operating life and improved functional characteristics being obtained for these devices.

While I have illustrated and described my novel driving means in more or less detail it will be understood, of course, that I do not wish to be correspondingly limited but regard my invention as including all changes and modifications coming within the spirit of the invention and the scope of the appended claims.

Having thus described my invention, I claim:

1. A drive for auxiliary devices, comprising a rotary power shaft, a group of rotatable drive members located in arcuate relation to said shaft and including drive members disposed above and on both sides of said shaft and said drive members all being of the type which are driven continuously during the rotation of said shaft, an electromagnetic coupling connected with said shaft, means for electrically energizing said coupling, and an endless torque transmission member operably engaging and extending around all of said drive members and coupling, said coupling being operable with continuous slippage while energized so as to drive all of said drive members simultaneously from said shaft at a speed which will be substantially constant for all power shaft speeds above a predetermined value.

2. A drive for auxiliary devices, comprising a rotary power shaft, a single drive pulley spaced from said power shaft, a group of drive pulleys disposed in an annular series about said single drive pulley, an electromagnetic coupling on said shaft and provided with a pair of pulleys, means for electrically energizing said coupling, a belt connecting said single drive pulley with one of the pulleys of said coupling, and a second belt forming a continuous driving loop extending around said group of drive pulleys and around the other pulley of the coupling, said coupling being operable with continuous slippage while energized so as to drive all of said drive pulleys simultaneously from said shaft at a speed which will be substantially constant for all power shaft speeds above a predetermined value.

HOWARD J. FINDLEY.

REFERENCES CITED

The following references are of record in the file of this patent:

UNITED STATES PATENTS

| Number | Name | Date |
|---|---|---|
| 643,413 | Kennedy | Feb. 3, 1900 |
| 701,157 | Credlebaugh | May 27, 1902 |
| 704,574 | Pintsch | July 15, 1902 |
| 1,062,780 | Kennedy | May 27, 1913 |
| 1,774,492 | Thorne | Aug. 26, 1930 |
| 1,868,130 | Bauer | July 19, 1932 |
| 2,005,486 | Wilson | June 18, 1935 |
| 2,037,436 | Roddewig, et al. | Apr. 14, 1936 |
| 2,079,724 | Van Ranst | May 11, 1937 |
| 2,097,483 | Weydell | Nov. 2, 1937 |
| 2,100,076 | Gilmore | Nov. 23, 1937 |
| 2,154,303 | Cooper | Apr. 11, 1939 |
| 2,193,837 | Winther | Mar. 19, 1940 |
| 2,186,290 | Gordon et al. | Jan. 9, 1940 |
| 2,250,806 | Logue | July 29, 1941 |
| 2,255,420 | Graham | Sept. 9, 1941 |
| 2,266,164 | Claytor | Dec. 16, 1941 |
| 2,287,953 | Winther | June 30, 1942 |
| 2,310,081 | Hill | Feb. 2, 1943 |

FOREIGN PATENTS

| Number | Country | Date |
|---|---|---|
| 466,978 | France | Mar. 20, 1914 |